(12) United States Patent
Kramer et al.

(10) Patent No.: US 12,134,224 B2
(45) Date of Patent: Nov. 5, 2024

(54) DEVICE AND METHOD FOR SURFACE SMOOTHING ADDITIVELY MANUFACTURED SHAPED PARTS CONSISTING OF PLASTIC

(71) Applicant: DyeMansion GmbH, Planegg (DE)

(72) Inventors: Philipp Kramer, Munich (DE); Felix Ewald, Munich (DE)

(73) Assignee: DyeMansion GmbH, Planegg (DE)

( * ) Notice: Subject to any disclaimer, the term of this patent is extended or adjusted under 35 U.S.C. 154(b) by 500 days.

(21) Appl. No.: 17/377,916

(22) Filed: Jul. 16, 2021

(65) Prior Publication Data

US 2021/0339459 A1 Nov. 4, 2021

Related U.S. Application Data

(63) Continuation of application No. PCT/EP2020/051282, filed on Jan. 20, 2020.

(30) Foreign Application Priority Data

Jan. 18, 2019 (DE) ..................... 10 2019 101 351.8

(51) Int. Cl.
*B29C 59/08* (2006.01)
*B33Y 40/20* (2020.01)

(52) U.S. Cl.
CPC ............... *B29C 59/08* (2013.01); *B33Y 40/20* (2020.01)

(58) Field of Classification Search
CPC ....... B29C 59/08; B29C 64/10; B29C 64/106; B29C 64/112; B29C 64/118; B29C 64/124; B29C 64/129; B29C 64/135; B29C 64/141; B29C 64/147; B29C 64/153; B29C 64/159; B29C 64/165; B29C 64/171; B29C 64/176; B29C 64/182; B29C 64/188; B29C 64/194; B29C 59/085; B29C 64/30;
(Continued)

(56) References Cited

U.S. PATENT DOCUMENTS 3,475,229 A 10/1969 Green et al.
3,851,426 A 12/1974 Lemelson
(Continued)

FOREIGN PATENT DOCUMENTS

AT 305 512 A 2/1973
DE 10 2016 115 676 A1 3/2017
(Continued)

OTHER PUBLICATIONS

Notice of Allowance issued by the Korean Patent office for KR Patent Application No. 10-2021-7024891, dated Dec. 5, 2022.
(Continued)

*Primary Examiner* — Jamel M Nelson
(74) *Attorney, Agent, or Firm* — Myers Wolin, LLC

(57) ABSTRACT

A method is provided for surface smoothing an additively manufactured shaped part consisting of plastic. The method has an explosion step with which the surface of the shaped part is smoothed in a process chamber by igniting a combustible process gas introduced into the process chamber, the surface of the shaped part being partly dissolved in at least some sections by the ignited process gas. Also provided is a device for surface smoothing additively manufactured shaped parts consisting of plastic.

11 Claims, 3 Drawing Sheets

(58) Field of Classification Search
CPC ... B29C 64/364; B29C 64/371; B29C 64/393; B29C 64/40; B33Y 10/00; B33Y 30/00; B33Y 40/20
See application file for complete search history.

(56) References Cited

U.S. PATENT DOCUMENTS

2016/0312322 A1     10/2016  Kemmer et al.
2017/0225252 A1*     8/2017  Illston .................. B22F 3/24

FOREIGN PATENT DOCUMENTS

DE      102017200191 A1    7/2018
KR      10-2016-0117444 A  10/2016

OTHER PUBLICATIONS

Notification of Transmittal of Translation of the International Preliminary Report on Patentability with Written Opinion issued by The International Bureau of WIPO for corresponding International Patent Application No. PCT/EP2020/051282, mailed on Jul. 29, 2021.
International Search Report issued for corresponding International Patent Application No. PCT/EP2020/051282 mailed on Mar. 4, 2020.
Notice under Rule 71 (3)EPO Intention to Grant issued by the European Patent Office for European Patent Application No. 20 701 950.6-1014, dated Sep. 9, 2022, with English translation attached.

* cited by examiner

DEVICE AND METHOD FOR SURFACE SMOOTHING ADDITIVELY MANUFACTURED SHAPED PARTS CONSISTING OF PLASTIC

CROSS REFERENCE TO RELATED APPLICATIONS

This application is a continuation under 35 U.S.C. § 120 of International Application PCT/EP2020/051282, filed Jan. 20, 2020, which claims priority to German Application No. 10 2019 101 351.8, filed Jan. 18, 2019, the contents of each of which are incorporated by reference herein.

FIELD OF THE INVENTION

The invention relates to a method for surface smoothing of an additively manufactured molded part consisting of plastic, as well as a device, by means of which the method can be carried out.

BACKGROUND

It is known to produce plastic objects or molded parts from plastic in a generative or additive manufacturing process, whereby the objects are built up layer by layer. Hereinafter, the generative or additive manufacturing processes are generally referred to as 3D printing processes or printing processes. All suitable plastics, such as polyamides or other thermoplastics, can be used as the starting material for the objects or molded parts to be produced in a 3D printing process.

The production of such molded parts in a 3D printing process has the disadvantage that the surface of the molded parts is rough or porous and often does not meet industrial requirements for surface quality. Therefore, the molded parts can be subject to increased wear. On the other hand, the porous surface structure means that dirt can adhere relatively easily to the surface. The aesthetics and haptics of the molded part can thus be significantly impaired.

In order to at least partially eliminate the rough or porous surface structure of such molded parts, from prior art it is known to grind and/or polish the surface of the molded parts. Thereby, the surface of the molded parts can be made smoother. However, extensive removal of the pores is only possible with considerable effort. The degree of surface gloss achieved by mechanical surface finishing processes is often insufficient.

However, polishing or grinding the surface of the molded part is not possible in every case, as this may result in considerable material removal. The material removal may significantly change the geometry of the molded part, which is undesirable in many cases.

In addition, mechanical surface finishing processes reach their limits with flexible materials such as TPU or TPE and have almost no effect on surface roughness.

Alternatively, it is known from the prior art to vaporize the surface of the molded part with acid or solvent in order to achieve a smoothing of the surface. In this case, the surface of the molded part is dissolved, whereby the pores are largely closed and the surface is smoothed. However, the use of such surface treatment agents is not always desirable, especially if the molded parts are worn on the body or come into contact with the skin during use, which is the case, for example, with an eyeglass frame produced using the 3D printing process. In addition, when the surface is vaporized with acid or solvent, it cannot be ruled out that when the pores are closed, the surface treatment agents are trapped in them—even if only in very small quantities—which, in the worst case, may escape again when the molded part is used.

Furthermore, the chemical reaction often may only be stopped by creating a vacuum in the treatment chamber and removing the solvent/acid from the treatment chamber. This often results in bubbles on the surface of the molded part, especially in the corners and exposed surface sections.

In addition, it is not possible to smooth the surface of molded parts made from acid- or solvent-resistant materials—the surface of such molded parts can only be smoothed using mechanical processes, but with the above-mentioned limitations.

Therefore, the present disclosure is based on an object to enable solutions for an alternative smoothing of surfaces of additively manufactured molded plastic parts.

SUMMARY

According to this disclosure, this object may be solved by a method for surface smoothing of an additively manufactured molded part made from plastic, as well as by a device for surface smoothing of additively manufactured molded parts made from plastic according to the independent claims. Preferred embodiments and further developments of the invention are specified in the respective dependent claims.

Accordingly, a method for surface smoothing of an additively manufactured molded part made from plastic is provided, the method comprising an explosion step by means of which the surface of the molded part is smoothed in a process chamber by igniting a combustible process gas introduced into the process chamber, wherein the surface of the molded part is at least partially dissolved by the ignited process gas, the method comprising a heating step of heating the molded part to a predetermined temperature that is lower than the melting temperature of the plastic of the molded part, wherein the heating step is carried out prior to the explosion step.

In this way, the surface of the molded part is smoothed in a particularly simple manner, in particular, without the use of acidic agents or other solvents and without the aid of material-removing equipment or processes. By the ignition of the process gas, the surface of the molded part is temporarily dissolved or molten, whereby pores on the surface are closed without significantly changing the geometry of the molded part. In addition, powder particles adhering to the surface are burned off by ignition of the process gas. The explosion step of the method according to embodiments of the invention takes only a few milliseconds to fractions of a millisecond, whereby the desired smoothing effect is achieved without changing the geometry of the molded part. In the context of the present invention, "dissolving the surface" is always to be understood as "melting the surface".

It has been shown that by smoothing the surface of the molded part using only the explosion step, a much better smoothing effect is achieved, if necessary, at exposed areas of the molded part (such as edges or protrusions) than on flat surface areas of the molded part. The result can be an inhomogeneous appearance of the surface with very smooth areas at the exposed locations and less smooth areas at the other locations.

Surprisingly, by heating the molded part to a predetermined temperature in accordance with the heating step of a method according to the invention, a significantly more homogeneous surface smoothing can be achieved, i.e. the same smoothing effect of high quality is achieved both at the exposed areas of the molded part and at the flat surface portions. It is therefore particularly advantageous to carry out the heating step before the explosion step.

By heating the molded part to a predetermined temperature before the process gas is ignited, the smoothing effect caused by the ignited process gas is supported in an advantageous manner, especially on flat surface portions of the molded part. In fact, it has been shown that the temperature input into the surface of the molded part after ignition of the process gas results in surfaces of the exposed portions of the molded part being heated significantly better (i.e. reaching higher temperatures) or being heated significantly faster than the surfaces of the other (flat) sections.

By heating the molded part to a predetermined temperature in accordance with the heating step, it is advantageously achieved that these differences arising in the explosion step during temperature application do not have a negative effect on the quality of the surface smoothing. The molded part may thus reach higher temperatures or be heated more quickly during ignition of the process gas, also at the flat surface portions. In this way, the same high-quality smoothing effect is achieved both on the exposed areas of the molded part and on the other areas.

The explosion resulting from the ignition of the process gas may last only a few milliseconds or even fractions of a millisecond, so that the temperature required for surface smoothing may not be reached or only for too short a time. Another advantage of a process according to the invention is that the heating of the molded parts in the heating step considerably accelerates the attainment of the temperature required for surface smoothing in the explosion step, so that most of the heat energy generated by the explosion of the process gas is available for smoothing the surface and does not have to be used for attaining the required temperature.

Surprisingly, it has been shown that by heating the molded parts in the first step, high-quality smoothing may also be achieved for flat portions of the molded part, and that this heating at the same time has no negative effects on the quality of the smoothing in the exposed surface areas.

It is advantageous if at least the surface of the molded part is heated in the heating step.

Advantageously, the predetermined temperature may be between 50° C. and 400° C., preferably between 100° C. and 300° C. In any case, however, the predetermined temperature is below the melting temperature of the plastic of the molded part.

In an embodiment of the invention, it may be advantageous if the explosion step is carried out several times. The individual explosion steps are preferably carried out at intervals. This achieves an even better smoothing effect, since a surface smoothed by one explosion step may be smoothed even further by a further explosion step.

In one embodiment of the invention, it may be advantageous if the heating step and the explosion step are carried out several times. It may be advantageous if the heating step and the explosion step are carried out alternately. The individual steps are preferably carried out at intervals.

In the explosion step, an explosion of the process gas in the process chamber may be caused by igniting the process gas, wherein the temperature caused by the explosion of the process gas of preferably at least 1,500° C., particularly preferably between 2,000° C. and 3,500° C., is maintained for a period of 0.1 ms to 100 ms.

It may be advantageous if the process gas is introduced into the process chamber at a pressure of up to 0.1 bar to 25 bar, preferably 0.3 bar to 2 bar.

In order for sufficient thermal energy to be released when the process gas explodes, the filling pressure in the process chamber would have to be well above 25 bar. This would have the disadvantage that molded parts having, for example, cavities with very thin walls could be damaged due to the pressure differences between the cavities and the filling pressure. However, it has been shown that due to the heating of the molded parts in the heating step, the filling pressure may be reduced to below 25 bar, in most cases even to below 1 bar, while still releasing sufficient heat energy for surface smoothing when the process gas explodes. This significant reduction in filling pressure also ensures that the molded parts are not damaged.

The process gas may be a mixture of oxygen and a fuel gas, in particular hydrogen, natural gas and/or methane.

It may be advantageous if the air present in the process chamber is at least partially or alternatively completely removed before the process gas is introduced into the process chamber.

By at least partially or completely removing the air present in the process chamber, it is achieved that the filling pressure in the process chamber may be further reduced. Removing the air from the process chamber also removes nitrogen from the process chamber, which absorbs a comparatively large amount of heat energy during the explosion of the process gas, so that the remaining heat energy would not be sufficient to reliably achieve the desired surface smoothing, particularly at low filling pressures. The less nitrogen remains in the process chamber, the lower the pressure at which the process gas is introduced into the process chamber may be. This nevertheless ensures that the desired surface smoothing is reliably achieved. In addition, better metering of the process gas introduced into the process chamber is possible.

In one embodiment of the invention, the heating step may be carried out in the process chamber.

The pressure in the process chamber may be brought to ambient pressure immediately after the explosion of the process gas.

This allows the pressure in the process chamber to be abruptly brought to the pressure prevailing outside the process chamber, whereby the temperature inside the process chamber may be abruptly reduced to below the melting temperature of the plastic of the molded part, preferably to the ambient temperature (temperature outside the process chamber). The dissolving or melting of the surface of the molded part caused by the ignition of the process gas is thus interrupted or terminated before a change in the geometry of the molded part can occur. In addition, the molded part is thus cooled immediately after the explosion of the molded part.

In one embodiment of the invention, cooling means may also be provided to cool the interior of the process chamber (either after the overpressure has been released or before the overpressure is released). Thus, the cooling of the molded part may be assisted.

In one embodiment of the invention, the molded part may be colored prior to the explosion step or prior to the heating step. It has been shown that smoothing the surface after coloring provides a more homogeneous surface appearance.

In a further embodiment of the invention, the molded part may be colored after the explosion step. By smoothing in the explosion step, different surface properties caused by the 3D printing are compensated, which enables a particularly homogeneous coloring. Tests have shown that after mechanical surface smoothing, for example by grinding, no such homogeneous coloring is possible as after smoothing in the explosion step.

It is advantageous if a dye selected from the group comprising metal complex dyes, acid dyes, reactive dyes, azo dyes, disperse dyes, and mixtures thereof is used for dyeing the molded parts.

For dyeing, a dye mixture may be prepared wherein the dye is dissolved in a solvent, wherein between 0.05 g and 50 g, preferably between 0.05 g and 25 g, more preferably between 0.1 g and 10 g of the dye are added to the solvent per liter.

In one embodiment of the invention, an amphoteric wetting agent may be added to the dye mixture. In the dyeing mixture, the amphoteric wetting agent may have a dye-inhibiting effect and retard dye uptake by the molded part. For example, it has been found that stains can form on the surface of the molded part in the case of red and blue colorants or shades. By adding an amphoteric wetting agent to the coloring mixture, such stain formation may be significantly reduced or avoided, so that an overall more homogeneous color appearance of the colored molding may be ensured.

In a still further embodiment of the invention, the molded part may be mechanically and/or chemically smoothed before the explosion step or before the heating step and/or after the explosion step. The mechanical smoothing may comprise grinding, blasting, polishing and combinations thereof. Chemical smoothing may include smoothing by means of a solvent or acid.

By grinding the surface beforehand, the latter may be improved or adapted in terms of geometry.

When blasting the surface of the molded part (both before the explosion step or before the heating step and after the explosion step), it has proved particularly advantageous to use spherical abrasives for this purpose.

Abrasive blasting before the explosion step or before the heating step by means of the spherical abrasives may achieve an initial smoothing of the surface of the molded part. In addition, this densifies the surface. With the subsequent explosion step, the (possibly compacted) surface is then smoothed even further.

Abrasive blasting after the explosion step by means of the spherical blasting agents allows the surface of the molded part to be compacted.

In addition, the surface of the molded part may be matted as a result. It has been shown that matting of the surface may also be achieved by means of blasting media of other shapes, such as cylindrical or cuboidal blasting media, but also with broken material, such as broken glass.

It is particularly advantageous if abrasive blasting media made of plastic are used for blasting, since the degree of hardness of blasting media made of plastic is significantly lower than the degree of hardness of, for example, precious corundum, ceramic beads or glass beads. This effectively prevents the surface from being roughened or even damaged during compaction or smoothing. In addition, mineral blasting media may cause dust and thus contaminate the surface. Metal abrasion from metallic blasting media may also contaminate the surface.

However, spherical abrasive blasting media made of plastic (plastic balls) are particularly advantageous, as they may be used to achieve optimum compaction of the surface of the molded part.

Mechanical and/or chemical smoothing and dyeing before the explosion step and/or before the heating step and/or after the explosion step may also be combined. That is, prior to the explosion step or prior to the heating step, the molded part can be mechanically and/or chemically smoothed and/or colored, or after the explosion step, the molded part can be mechanically and/or chemically smoothed and/or colored.

The additive manufacturing method for producing the molded part may include:
stereolithography,
powder bed methods, such as laser sintering (e.g., selective laser sintering),
laser beam fusion (e.g., laser powder bed fusion), if suitable for producing molded plastic parts,
electron beam melting, if suitable for producing molded parts made of plastic,
fused layer manufacturing,
multi-jet modeling or multi-jet fusion, and
poly-jet modeling.
fused filament fabrication The methods according to embodiments of the invention are particularly advantageous for molded parts printed with the following materials or combinations thereof:
polyamide 6 (PA6),
polyamide 12 (PA12),
polyamide 11 (PA11),
thermoplastic elastomers (TPE),
thermoplastic polyurethane (TPU),
polymethyl methacrylate (PMMA),
polypropylene (PP),
polyetheretherketone (PEEK), and
poly(ether ketone ketone) (PEKK).

By smoothing the surface of the molded parts produced in a 3D printing process according to the invention, the different surface properties caused by the 3D printing are compensated in a particularly advantageous manner, which enables more homogeneous post-processing of the molded part, such as more homogeneous coloring.

Another particular advantage of the method according to methods of the invention is that the molded parts are pressure-tight against any media after smoothing according to the invention. Due to the very high quality of the surface smoothness achievable by the method according to embodiments of the invention, the molded parts may be used in the medical field (for example as orthoses/prostheses or as surgical instruments) and also in the food industry (e.g. packaging).

Further, there is also provided a device for surface smoothing of additively produced molded parts made of plastic, having a process chamber which can be closed in a pressure-tight manner and into which the molded parts to be smoothed can be introduced, wherein
the process chamber is connectable to a process gas source for introducing a process gas into the process chamber,
the process chamber is provided with ignition means for igniting a process gas introduced into the process chamber, and
a heating device is associated with the process chamber, by means of which the molded parts introduced into the process chamber can be heated to a predetermined temperature, which is lower than the melting temperature of the plastic of the molding, prior to ignition of the process gas.

In addition, a cooling device may be associated with the process chamber to cool the molded parts after ignition of the process gas.

The heating device may be arranged inside or at least partially inside the process chamber.

It is advantageous if the process chamber can be connected to a venting device with which air present in the process chamber can be at least partially removed before the process gas is introduced.

The venting device may be a vacuum pump.

The process chamber may have a vent valve, in particular a quick exhaust valve, via which excess pressure in the process chamber can escape after an explosion of the process gas introduced into the process chamber, which is caused by the ignition of the process gas.

BRIEF DESCRIPTION OF THE DRAWING

Further details and features of the invention will be apparent from the following description in conjunction with the drawing, showing.

DETAILED DESCRIPTION OF THE PREFERRED EMBODIMENTS

Figure 1A:
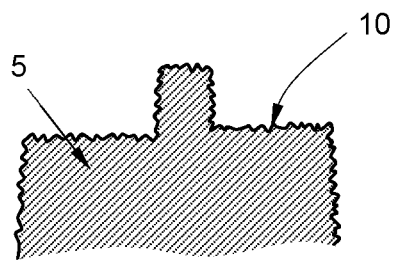
FIGS. 1A-C are schematic enlarged illustrations of a portion of a surface of an additively manufactured molded part made of plastic, which is smoothed according to the method according to embodiments of the invention.
Figure 1B:
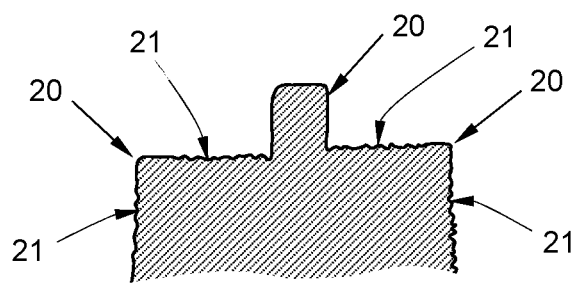
Figure 1C:
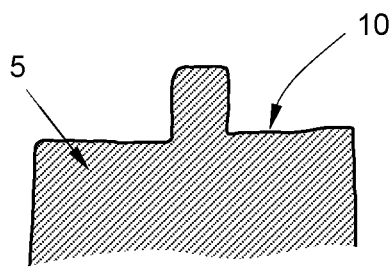

FIG. 1A shows an enlarged portion of a surface 10 of a molded part 5 produced in a 3D printing process, in FIG. 1B, the molded part shown in FIG. 1A in which surface smoothing was performed by the explosion of the process gas (explosion step), and in FIG. 1C, the molded part shown in FIG. 1A in which surface smoothing was performed by heating (heating step) and by the subsequent explosion of the process gas (explosion step).

A molded part 5 made of plastic and produced by a 3D printing process has a rough or porous surface 10 (as shown in figure (a)), which can have a negative effect on the haptics of the molded part. In addition, dirt may adhere relatively easily to the rough surface 10, so that in many cases a smooth surface is also desirable for hygienic reasons. Subsequent coloring of the molded part may also only be carried out at the cost of deficiencies in the coloring quality; for example, homogeneous coloring cannot be achieved.

However, due to technical conditions of known 3D printing processes or 3D printers used for this purpose, such molded parts made from plastic cannot be produced with the desired surface smoothness, so that post-processing of the surface becomes necessary.

FIG. 1B shows molded part 5 in which surface smoothing was performed by igniting a process gas (explosion step).

For surface smoothing, the molded part 5 is placed in a process chamber in which the process gas to be ignited is also introduced. Ignition of the process gas causes an explosion in the process chamber, with which a temperature of between 1,500° C. and 3,500° C. is reached in the process chamber, which is maintained for a period of up to 100° ms. As can be seen from figure aB, the entire surface is smoothed compared to the surface 10 from FIG. 1A.

Depending on the material or 3D printing process used, it is possible that the desired smoothing effect is only achieved on the surfaces of the exposed areas 20. The flat surface areas 21 of the surface 10 are also smoothed, but the smoothing effect in these areas 21 does not correspond to the desired smoothing effect (as achieved at the exposed areas 20). The result is a smoother surface compared to the surface shown in figure aA, which has an inhomogeneous appearance depending on the material or 3D printing process used.

The significantly better surface smoothness at the exposed areas 20 compared to the surface smoothness in the areas 21 results from the fact that at the exposed areas 20 the surface area is high or even very high in relation to the volume, so that the thermal energy introduced into the exposed areas by the explosion of the process gas may only be dissipated very poorly into the interior of the molded part 5. At the exposed areas 20, the thermal energy introduced is therefore available almost exclusively for dissolving and melting the surface.

In the flat surface areas 21, on the other hand, the surface area is relatively small in relation to the volume, so that the thermal energy introduced there may be dissipated relatively well into the interior of the molded part 5. Only a small part of the thermal energy introduced into the areas 21 is therefore available for dissolving and fusing the surface 21, so that the desired smoothing effect may possibly not be achieved in the areas 21.

In FIG. 1C, the molded part shown in FIG. 1A is shown, the surface of which has been smoothed by heating (heating step) and by the subsequent explosion of the process gas (explosion step). In addition to the explosion process caused by the ignition of the process gas introduced into the process chamber, it may be advantageous to heat the molded part 5 to a predetermined temperature lower than the melting temperature of the plastic of the molded part 5 before the explosion process (explosion step) (warm-up step). Depending on the material used for the molded part 5, this temperature can be between 50° C. and 400° C. For most materials used for additive manufacturing of molded parts, this temperature is usually between 100° C. and 300° C. In any case, however, this temperature is below the melting temperature of the plastic material of the molded part.

By heating the molded part before it is subjected to the explosion process, it is achieved that the thermal energy of the explosion process introduced into the planar surface areas 21 is sufficient to achieve the desired surface smoothing during the explosion process. Although even after heating, the heat energy of the explosion process introduced into the surface areas 21 is well dissipated into the interior of the molded part 5, the heat input is still sufficient to achieve the desired surface smoothing. In fact, heating the molded part reduces the dissipation of the introduced heat energy into the interior of the molded part 5, so that more heat energy is effectively available at the surface 21 for dissolving or melting and fusing the surface area 21.

Depending on the material or 3D printing process used, the entire surface 10 of the molded part 5 may have the desired surface smoothing and thus a homogeneous appearance, as can be clearly seen in FIG. 1C.

After smoothing the surface according to the process of this disclosure, the molded part may be colored. Due to the high quality and high homogeneity of the smoothness of the surface achieved by the surface smoothing according to the disclosure, a particularly homogeneous appearance of the colored surface is achieved. Alternatively, dyeing may also be carried out before smoothing.

Before or after the smoothing of the surface according to the invention, the surface may be mechanically treated, for example ground, blasted or polished.

Abrasive blasting of the surface is preferably carried out with spherical steel media, in particular, made of plastic (plastic balls). Preferably, the plastic balls are selected such that they have a degree of hardness corresponding approximately to the degree of hardness of the plastic of the molded part. A slightly higher degree of hardness of the plastic balls is possible. By abrasively blasting the surface by means of the plastic balls, an initial smoothing of the surface may be achieved. In addition, the surface is compacted. Abrasive blasting after smoothing may also be performed to produce a smooth but more matte surface.

The molded part may be colored before or after blasting.

Figure 2:
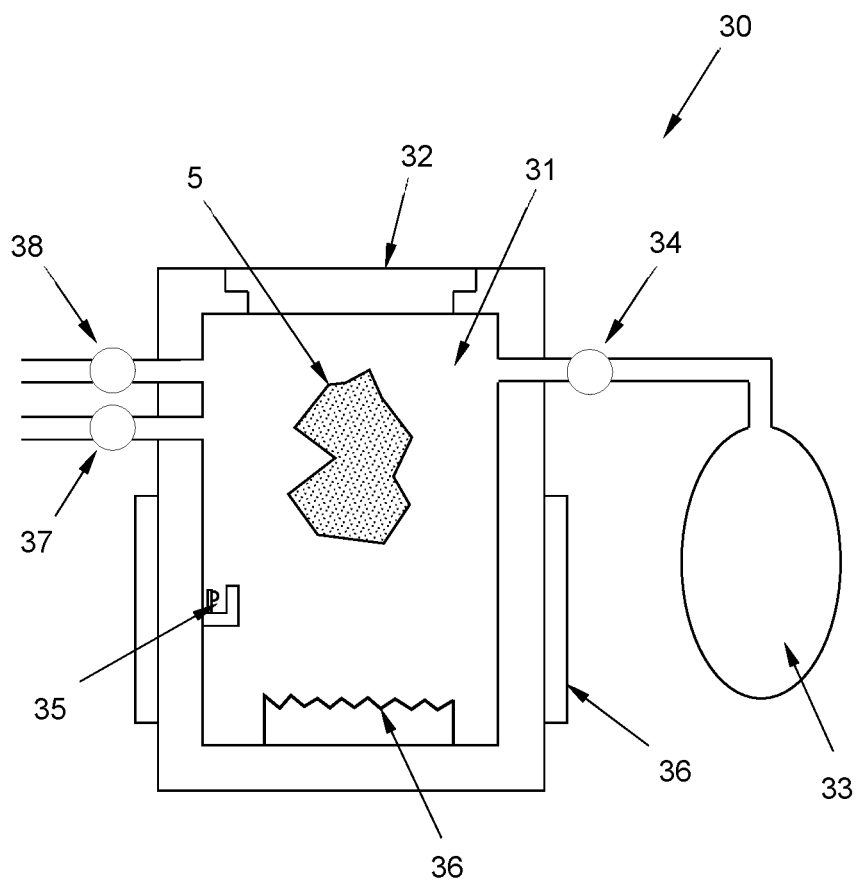
FIG. 2 is a device for surface smoothing according to this disclosure.

FIG. 2 shows a device 30 according to this disclosure for surface smoothing of additively produced molded parts 5 made of plastic. With the aid of the device described below, steps of the method according to embodiments of the invention are also explained (again) in more detail.

The device 30 comprises a process chamber 31 which can be closed in a pressure-tight manner by means of a flap, door or lid 32. The molded parts 5 to be smoothed are introduced into the process chamber 31 through the lid 32. These are molded parts manufactured additively from plastic material the surfaces of which are to be smoothed. The process chamber 31 is also designed to be pressure-tight and may be designed, for example, as a cylindrical housing. If required, several moldings to be smoothed may also be placed in the process chamber 31.

The process chamber 31 can be charged with a combustible process gas which is ignited to smooth the surface of the molded part 5. The explosion caused by the ignition of the process gas leads to a smoothing of the surface of the molded part due to the heat development, whereby temperatures of between 1,500° C. and 3,500° C. are reached over a period of time of between 0.1 ms and 100 ms. This heat development dissolves or melts and fuses the surface of the molded part without significantly changing the geometry of the molded part. Existing pores are effectively sealed. At the same time, the surface of the molded part is made pressure-tight against any media.

To supply the process chamber 31 with the process gas, it can be connected to a process gas source 33 via a supply device 34, which may have a feed line and a pump. For igniting the process gas supplied to the process chamber 31, an ignition device 35 is provided, which is arranged inside the process chamber 31 or projects into it. The ignition device 35 may be an electric ignition device. The ignition device may be activated after the lid 32 has been closed. Preferably, the ignition device 35 is arranged in the process chamber 31 such that it can be easily cleaned if necessary. The ignition device 35 may comprise a plurality of ignition devices (such as a plurality of electrical ignition devices).

The process gas may comprise a mixture of oxygen and a fuel gas. The fuel gases may include hydrogen, natural gas, or methane gas, although other suitable fuel gases may be used.

The process gas source 33 may receive the process gas, i.e. the mixture of oxygen and fuel gas, so that ultimately only one container needs to be provided for storing the process gas.

Alternatively, the process gas source 33 may comprise multiple containers (e.g., gas cylinders), each of which holds a particular fuel gas or the oxygen. In this case, the process gas source 33 or the multiple containers of the process gas source may be connected to the process chamber 31 via a mixing device. The mixing device may be designed in such a way that the process gas components, i.e. the oxygen and the fuel gas used, are supplied to the process chamber one after the other. Alternatively, the mixing device may be designed to mix the process gas from the oxygen and the fuel gas used and to supply this mixture to the process chamber 31.

It is advantageous if the fuel gas is present in excess. The fuel gas may then act as a protective gas that attracts the oxygen present and thus prevents the oxygen from causing burns on the molded part 5.

By means of a pressure measuring device, the internal pressure of the process chamber 31 is monitored. When a certain filling pressure is reached, the process gas supply is stopped and the feed opening is closed in a pressure-tight manner. The filling pressure is approximately between 0.1 bar and 25 bar, preferably, between 0.3 bar and 2 bar.

To enable reliable metering of the process gas, the air still present in the process chamber 31 after closing the lid 32 is at least partially, but preferably as far as possible, removed from the process chamber 31 before the process gas is filled in.

According to FIG. 2, the air is extracted from the process chamber 31 by means of a venting device 37. The venting device 37 may comprise a vacuum pump, by means of which the process chamber 31 can be evacuated to a pressure of about 0.05 bar (or lower if required). This ensures that the mixing ratio of the process gas introduced into the process chamber 31 corresponds as far as possible to the mixing ratio at which the process gas was introduced into the process chamber 31.

A venting valve 38 may also be assigned to the process chamber 31, which is preferably designed as a quick venting valve. Via this quick exhaust valve 38, the excess pressure in the process chamber 31 may be released either after the surface smoothing process has been completed or in the event of a malfunction.

The quick exhaust valve 38 is kept closed until the surface smoothing process has been completed after ignition of the process gas. In a manner known per se, the closing of the quick exhaust valve 38 may be effected by spring action, while the opening of the quick exhaust valve 38 may be effected by hydraulic force against the spring action. The hydraulic pressure of the quick exhaust valve 38 is adapted to the reaction forces in the process chamber 31.

Immediately after the end of the explosion (which lasts between 0.1 ms and 100 ms) or after a short decay phase, the hydraulic cylinder opens the quick exhaust valve 38 and allows the excess pressure to escape. After the pressure has been released, the process chamber 31 can be opened.

The release of the excess pressure immediately after the explosion of the process gas also causes the temperature inside the process chamber to reduce abruptly to below the melting temperature of the plastic material of the molded part. This can prevent the molded parts from being further subjected to such a temperature after the explosion, which may lead to an unwanted change in the geometry of the molded parts. It may thus be advantageous to release the excess pressure in the process chamber 31 immediately after the explosion of the process gas, i.e. to bring the pressure in the process chamber to ambient pressure.

In order to achieve the desired surface smoothness even with materials for which the explosion step alone is not sufficient for smoothing, the device 30 according to embodiments of the invention is designed to heat the process chamber 31 before igniting the introduced process gas.

For heating up the process chamber 31, a heating device 36 is assigned to it. The heating device 36 may, for example, comprise a heating sleeve which is arranged on the wall of the process chamber 31 or is integrated into the wall of the process chamber 31. Alternatively, the heating device 36 may comprise a heating coil or a heating wire arranged in the process chamber. According to a further alternative, the process chamber may be heated by means of an infrared heating device. In a still further alternative, heating of the process chamber 31 may also be performed by means of a burner by applying flames to the interior of the process chamber 31.

The process chamber 31 or the interior of the process chamber 31 is heated by means of the heating device after the molded part 5 has been introduced and after the lid 32 has been closed, to a temperature that is below the melting temperature of the plastic material of the molded part 5. A corresponding sensor is provided for monitoring the temperature. The interior of the process chamber 31 is heated to between about 50° C. and 400° C., preferably to between about 100° C. and 300° C.

If venting of the process chamber 31 is necessary or desired (with the aid of the venting device 37), it is advantageous to carry this out before the process chamber 31 is heated up.

After heating up the interior of the process chamber 31, the process gas is supplied to the process chamber and after reaching the required filling pressure, the process gas is ignited. The ignition of the process gas causes an explosion in which the temperature in the process chamber 31 rises to approximately between 1,500° C. and 3,500° C. for a period of between 0.1 ms and 100 ms.

The duration of the explosion, the temperatures and explosion pressures that can be reached in this process may be adjusted by changing the mixing ratio of the process gas, by changing the filling pressure and by venting the process chamber beforehand. In this way, these parameters may be optimally adapted to the particular plastic material used for the molded part 5.

Figure 3A:
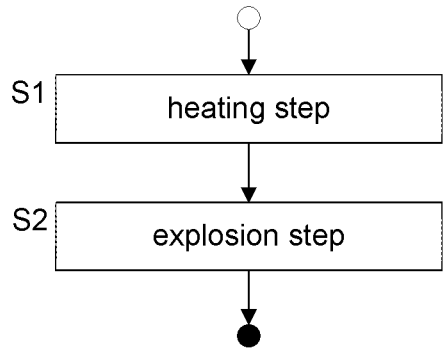
FIGS. 3A-C are three different variants of the method according to the invention.
Figure 3B:
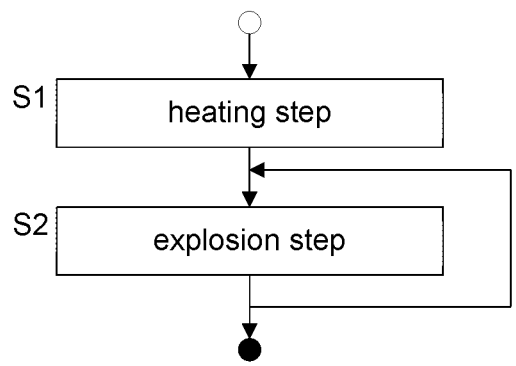

FIGS. 3A-B show three different variants of the method according to the invention.

According to the variant shown in FIG. 3A, the method according to the invention comprises a heating step S1 and an explosion step S2, with the heating step S1 being carried out temporally prior to the explosion step S2.

According to the alternative variant shown in FIG. 3B, the method according to the invention also comprises a warm-up step S1 and an explosion step S2. The warm-up step S1 is carried out before the explosion step S2. According to this variant, the explosion step S2 is carried out several times. Preferably, the individual explosion steps are carried out at intervals. Between two successive explosion steps, the process chamber 31 may be evacuated and new process gas may be supplied to the process chamber 31. It may be advantageous to supply the new process gas to the process chamber 31 or to perform the further explosion step only after the molded part has cooled down to a predetermined temperature.

Figure 3C:
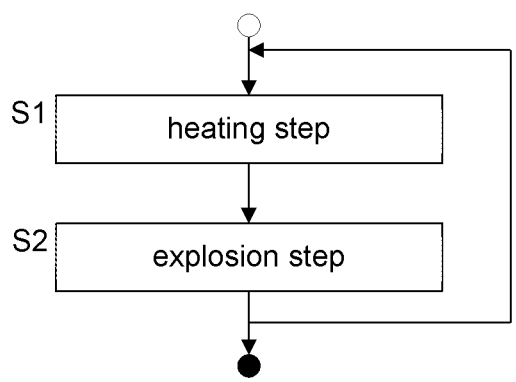

According to the alternative variant shown in FIG. 3C, the method according to the invention also comprises a heating step S1 and an explosion step S2, wherein the heating step S1 and the explosion step S2 being carried out several times. In an advantageous embodiment, the warm-up step S1 and the explosion step S2 are carried out alternately. After an explosion step, the process chamber 31 may be evacuated before the next warm-up step S1 is performed. After the further warm-up step S1, new process gas may be supplied to the process chamber 31.

REFERENCE NUMERALS 5 molded part
10 surface of the molded part 5
20 exposed areas or surface portions of the molded part 5
21 flat surface portions of the molded part 5
30 device for surface smoothing
31 process chamber of the device 30
32 lid/flap for closing the process chamber 31
33 process gas source
34 feeding device (e.g. pump) for introducing the process gas into the process chamber 31
35 ignition device for igniting the process gas
36 heating device (may also be designed as heating/cooling device)
37 venting device, e.g. vacuum pump
38 venting valve
S1 warm-up step
S2 explosion step

What is claimed is:

1. A method for surface smoothing of an additively manufactured molded plastic part, the method comprising:
a heating step by means of which the molded part is heated to a predetermined temperature lower than the melting temperature of the plastic material of the molded part, and
an explosion step by means of which the surface of the molded part is smoothed in a process chamber by igniting a combustible process gas that is introduced into the process chamber, wherein the surface of the molded part is at least partially dissolved by the ignited process gas,
wherein the heating step is carried out prior to the explosion step.

2. The method of claim 1, wherein in the heating step at least the surface of the molded part is heated.

3. The method of claim 1, wherein the predetermined temperature is between 50° C. and 400° C.

4. The method of claim 1, wherein the explosion step is carried out several times.

5. The method of claim 1, wherein the heating step and the explosion step are carried out a plurality of times.

6. The method of claim 1, wherein in the explosion step an explosion of the process gas is caused in the process chamber by ignition of the process gas, wherein the temperature caused by the explosion of the process gas of at least 1,500° C. is maintained for a period of 0.1 ms up to 100 ms.

7. The method of claim 1, wherein the process gas is introduced into the process chamber up to a pressure of 0.1 bar to 25 bar.

8. The method of claim 1, wherein the process gas is a mixture of oxygen and a fuel gas.

9. The method of claim 1, wherein the air present in the process chamber is at least partially removed before the process gas is introduced into the process chamber.

10. The method of claim 1, wherein the heating step is performed in the process chamber.

11. The method of claim 1, wherein the pressure in the process chamber is brought to ambient pressure immediately after the explosion of the process gas.

* * * * *